Jan. 5, 1932.　　　M. R. PIERCE　　　1,839,893

PHOTOGONIOMETER

Filed Nov. 27, 1929　　2 Sheets-Sheet 1

INVENTOR
MAURICE R. PIERCE
BY
Warren S. Orton.
ATTORNEY

Jan. 5, 1932.  M. R. PIERCE  1,839,893
PHOTOGONIOMETER
Filed Nov. 27, 1929   2 Sheets-Sheet 2
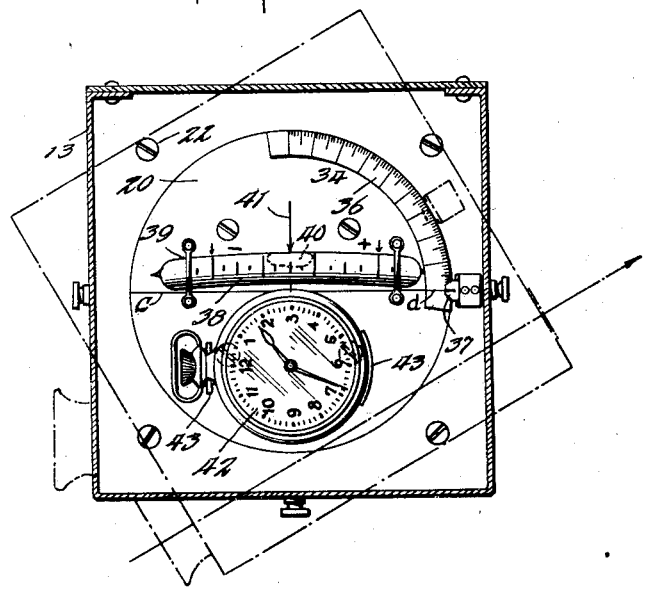
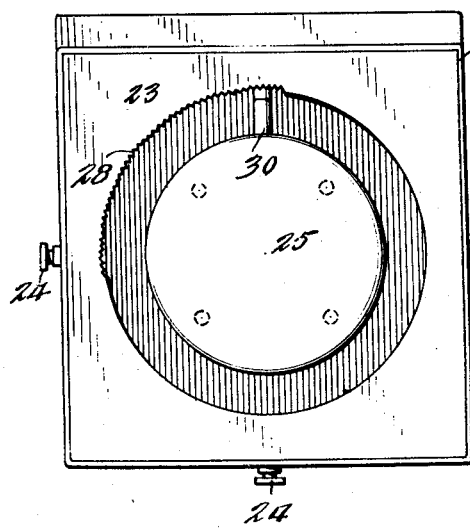 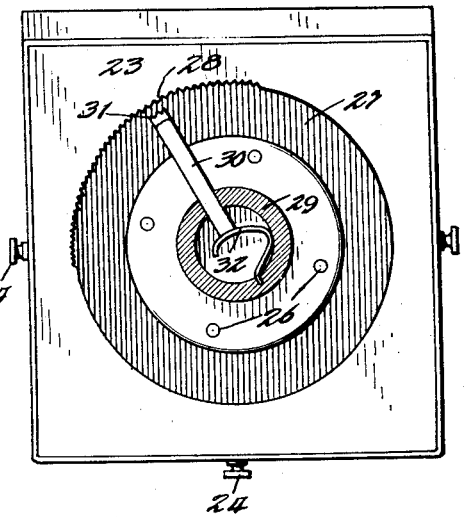
INVENTOR
MAURICE R. PIERCE
BY
Warren S. Orton.
ATTORNEY Patented Jan. 5, 1932

1,839,893

UNITED STATES PATENT OFFICE

MAURICE R. PIERCE, OF LAKEHURST, NEW JERSEY

PHOTOGONIOMETER

Application filed November 27, 1929. Serial No. 410,081.

The invention relates to a photogoniometer and specifically relates to an altitude reading recorder or camera sextants of the type used for determining the altitude of celestial and other distant bodies and in such aspects of the disclosure the invention constitutes a development of and improvement in certain features of the invention disclosed in my Patent No. 1,653,585, granted December 20, 1927, and of the invention disclosed in my co-pending application Serial No. 304,376 filed September 6, 1928 and entitled "Altitude reading recorder".

The primary object of the invention herein disclosed, as was the object in my co-pending application is to provide a single and simple device for accurately ascertaining and recording altitudes, zenith distance and other vertical angles of distant bodies.

The present disclosure features, as does the disclosure in my co-pending above identified application, a form of altitude or zenith distance observing instrument by means of which the observed readings may be photographically recorded at the instant the observation is made and at the same time to eliminate any necessity of using telescopes and other forms of lens containing instruments such as were disclosed in said application.

Still another object of the invention is to provide a simple, light portable form of sextant by means of which the altitude angles of celestial and other distant bodies can be quickly attained and by means of which extremely accurate readings of such angles and incidental minute corrections of such angle readings are made clearly visible to the eye of the observer.

This phase of the invention is attained by the providing of means whereby the instrument can be set during a preliminary observation to give the approximately correct reading of the inclination from the horizontal when trained on the distant body and the providing of an extremely sensitive corrective means for indicating at any instant of time a correction to be added algebraically to the preset approximate reading in order to obtain the true altitude angle. The invention further features the providing of an instrument for making a photographic record of both the preset approximate angle and of the corrective data to be added thereto at any instant of time under the control of the operator and at that instant of time when the operator believes the sighting device of the instrument is trained exactly on the distant body, the altitude angle of which is to be taken.

The invention has for other objects the providing of a compact construction forming a small size instrument which can be easily carried and a construction which can utilize as an attachment thereto of conventional form of camera thus eliminating necessity of providing for special forms of photographic means; the providing of illuminating means for permitting the use of the device at night or under conditions where there is insufficient light for either the visual inspecting of the angle indicating means or the photographing of the reading indications of the angle measuring parts of the instrument and in general, the providing of an inexpensive and accurate surveying and recording instrument which can be marketed at low cost of material and workmanship.

Various other objects and advantages of the invention will be in part obvious from an inspection of the accompanying drawings and in part will be more fully set forth in the following particular description of one form of mechanism embodying the invention, and the invention also consists in certain new and novel features of construction and combination of parts hereinafter set forth and claimed.

Figure 1:
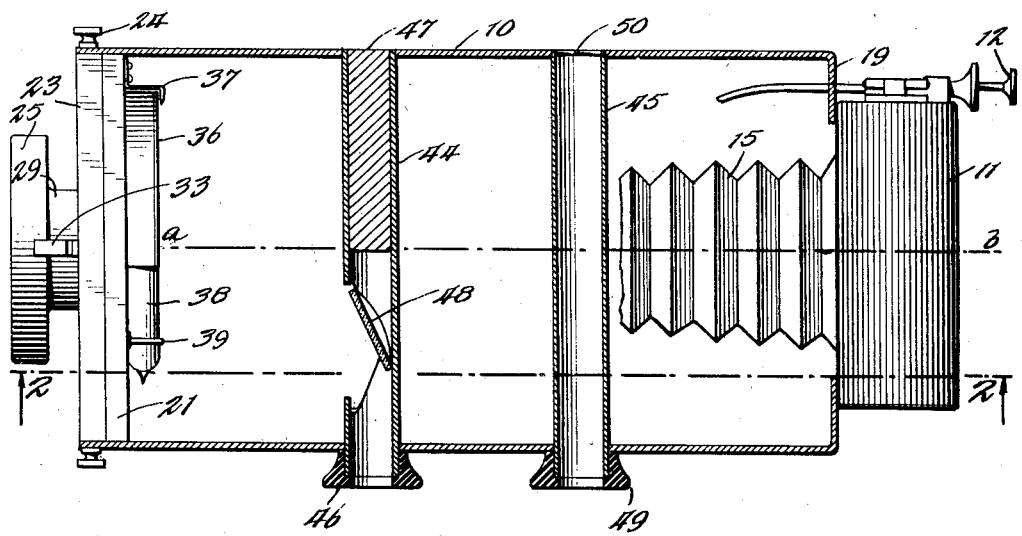
Fig. 1 is a view partly in plan and partly taken on the broken line 1—1 of Fig. 2 looking downward as indicated by the arrows and illustrating a preferred embodiment of the invention.
Figure 2:
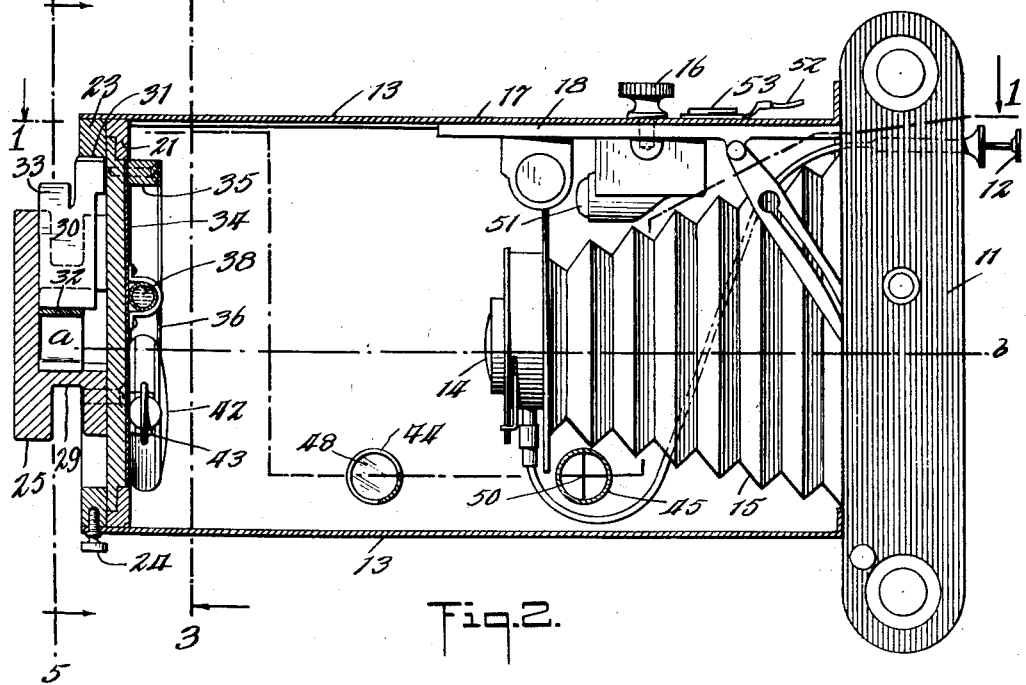
Fig. 2 is a view partly in side elevation and partly in vertical section taken on the line 2—2 of Fig. 1 looking in the direction indicated by the arrows.

Fig. 3 is a transverse sectional view taken on the plane indicated by the line 3—3 of Fig. 2, looking in the direction indicated by the arrows, showing in full line the disposition of the parts when the device is in its normal horizontal position and showing in dotted line the position of certain of the parts when the casing as a whole is tilted upwardly at an angle of about 30° with the sighting means trained on a distant body in the line of sight indicated by the long dot and dash arrow at the bottom of the figure;

Fig. 4 is a view in end elevation of the device shown in the preceding figures looking at the same from the left hand end of the device shown in Figs. 1 and 2, showing the handle at the adjacent end of the device and showing the instrument board locking device in its position locking the instrument board in its normal horizontal position as shown in full lines in the preceding figure; and Fig. 5 is a transverse sectional view taken on the line 5—5 of Fig. 2 looking in the direction indicated by the arrows, showing the instrument board locking means in unlocked position and in such position as it would assume when the instrument board and casing have been relatively rotated as indicated in dot and dash lines in Fig. 3.

In the drawings, there is shown two distinct and readily separate parts, one of which designated 10 will be referred to hereinafter as an instrument and the other 11 discloses a conventional and well known form of collapsible bellows camera, complete per se including its usual finger control 12. It is obviously within the scope of the disclosure to consider the camera 11 to be of the motion picture type or of the type which will take in rapid succession a limited number of pictures by actuating a control corresponding to the push button 12.

The instrument 10 includes a rectangular open end casing 13 in one open end of which is designed to be intruded the lens portion 14 and bellows 15 of the camera 11 with the camera demountably secured in place by means of a thumb screw 16 passed through the upper side 17 of the casing 13 and through the drop side or front wall 18 of the camera. The control 12 passes through an opening formed therefor in the wall 19 at the right side of the casing but it is understood that the casing 13 is substantially light tight, although it is obviously within the scope of the disclosure to eliminate the internal lighting device hereinafter disclosed and to open one or more sides of the casing or provide windows therein so as to expose the instrument hereinafter described to a source of light located externally of the casing.

Demountably positioned in the end of the casing opposite the end for receiving the camera is an instrument board 20 mounted for rotary movement about the optic axis of the camera indicated by the line a—b. The instrument board is mounted at its periphery in a mounting plate 21 fitted into the adjacent end of the casing. The plate is demountably secured by screw 22 to a rear plate 23 demountably secured to the casing 13 by screw 24. The instrument board is provided with a combined turning knob and casing handle 25 secured centrally thereby by rivets 26 and which project exteriorly of the end of the casing. This knob provides a means for supporting the instrument as a whole at this end and also provides a convenient means for rotating the instrument board relative to the casing. The rear plate 23 is provided with a circular recess 27 extending therethrough and disposed concentric with the axis a—b. The outlining edge of this recess is provided for 90° of its arc with teeth 28 as particularly shown in Figs. 4 and 5. These teeth are carefully machined so that each tooth space is exactly equal to one degree of rotary movement of the instrument board. It is obviously within the scope of the disclosure, however, to make the tooth spacings of any multiple of the unitary degree spacing illustrated and where extreme accuracy in the corrective readings is desired, it is suggested that the toothed spacing be made one half or some other definite fractional part of a degree.

Means are provided for locking the instrument board in its angularly adjusted position and for this purpose the hub 29 of the handle is shown to be hollow as indicated in Fig. 5 and a locking blade 30 is mounted for radial movement in the hub and is provided at its outer end with a plurality of teeth 31 designed to engage in the teeth 28 to secure the instrument board in whatever adjusted position it may be set. The locking blade is provided with a thumb engaging projection 33 projecting above the handle 25 by means of which the blade may be moved into unlocked position against the tension of its resetting spring 32.

The inner portion of the instrument board facing the camera is circular in outline as indicated in Fig. 3 and is faced with a sheet 34 of black enamel with white lettering and markings designed to permit the instruments carried thereby to be clearly and sharply visible. White figures on a black background photograph better than any other known contrasting colors and are easily seen through the binoculars hereinafter described. This sheet 34 is provided with a line of reference c—d which intersects its axis of rotation and as well as the optic axis a—b. The periphery 32 of the instrument board is provided with a raised segmental strip 35 on which is marked a scale 36 graduated from 0° to 90°, considered from the 3 o'clock towards the 12 o'clock position as shown in Fig. 3. Coacting with the scale 36 is a pointer 37 fixedly secured to the mounting plate 21. A long spirit level 38 is centered above the line of reference c—d and is secured to the instrument board to rotate therewith by means of fastening straps 39. The spirit level is so mounted that when the pointer is at the 0° position on the scale the bubble 40 is centered. The spirit level is graduated plus on one side and minus on the other of its bubble centered positions indicated by the arrow pointer 41 of Fig. 3, in terms of degrees and fractions of degrees of inclination which the bubble may assume when the spirit level is displaced slightly from its normal horizontal position. In the instant case the spirit level has such a length in each direction from its center indicated by the arrow pointer 41 that it can rotate one and one half degrees before the bubble reaches the end of the level. This type of spirit level is used when the scale 36 and the corresponding teeth at 28 are arranged to indicate whole degrees of rotation of the instrument board.

It is a feature of this disclosure that a highly sensitive type of spirit level be used as it is required in making certain observations such as in nautical surveying to come as close as is possible to exact angular readings even accurate to minutes and seconds of degrees. Following conventional practices in this respect, it is noted that the spirit level is slightly arched; in the instant case the level is disposed in a circle having a radius of about five feet. The present disclosure features the compactness of parts and this curved disposition of the spirit level provides a convenient space to accommodate a time indicator 42 demountably secured to the instrument board by spring clips 43 and in a manner so as to be readily demounted to permit comparison with a chronometer.

A binocular is fitted to the casing and permanently secured thereto so as to rotate therewith as the casing is rotated in space about the axis a—b. The binocular includes two eye tubes 44 and 45 of which the eye tube 44 nearest the instrument board is closed at the end opposite the eye piece 46 by means of a filler plug 47. Positioned in the tube between the eye piece 46 and the plug 47 is a reflector 48 so disposed at an angle to the tube that the operator looking into the left eye piece 46 sees the image of the spirit level and preferably the parts are so disposed that the position of the bubble is magnified and in general it is understood that every effort is made to render the bubble clearly visible to the operator as he is looking at the same through the left eye. The right eye tube 45 is a sighting tube and is provided at the end opposite the right eye piece 49 with cross hairs 50 designed to be trained on the distant bodies following conventional practices in this respect with sextants and similar sighting instruments.

For the purpose of illuminating the instrument board with its instruments thereon, a source of light 51 is herein shown to be an electric lamp disposed to direct its rays on to the instrument board.

The source of light is suitably supplied either from a contained battery or wherever a source of electric energy is available it may be obtained by suitable connections 52 leading from an external light source. A light control switch 53 may be used.

In operating and assuming for instance that it is desired to take the altitude of a star or other celestial body, the operator holding the device by means of the handle at one end and the camera at the opposite end elevates or depresses the device as a whole until the distant object whose elevation or depression is to be obtained is sighted past the cross hairs. Then unlocking the latch 30 by depressing on the thumb piece 33, the means for locking the instrument board is released and the instrument board is rotated or more properly the casing is rotated about the axis a—b, maintaining the instrument board approximately in its normal righted position which it occupied when the sighting means was directed at an object on the horizon. Ordinarily, the operator will set the reading on the scale 36 as accurately as possible and usually it is not extremely difficult for the experienced operator to set the instrument board when the distant object is in line with the cross hairs to the nearest whole degree. In the instant case, as illustrated in Fig. 3, the casing has been rotated to about 30° as indicated by the dot and dash position of the pointer on the scale. When the operator is assured that the casing has been rotated into such position that the spirit level is horizontal or almost so when the cross hairs are in line with the distant body, he releases the latch thus locking the instrument board in its rotated position. The operator will endeavor to maintain the distant body covered by the cross hairs and in this position will take one or more photographs of the readings of the instruments on the instrument board. Should it so happen that at the instant the photograph is taken, the casing should be tilted slightly from its preset angular position relative to the instrument board or rather if the spirit level is not exactly in its normal level position, any such variation of the spirit level from its normal horizontal position would be indicated by the shifting of the bubble in the level to right or left and by noting the position of the bubble relative to the scale on the spirit level a correction is made, either plus or minus, to the reading indicated on the segmental scale 36. It is noted for instance in Fig. 3 that the bubble 40 has shifted slightly to the right an amount less than the smallest fractional indication marked on the spirit level. However, even this slight shifting of the bubble which can be ascertained by calipering the readings on the spirit level and adding this correction. In the instant case the angle of elevation is 30° 05′.

As noted above it is within the scope of the disclosure to utilize a camera such as a motion picture camera which will take a series of pictures in rapid succession and by taking the means of the several readings, an extremely accurate observation may be obtained. It is also within the scope of the disclosure to substitute a telescope for the binoculars used.

Claims:

1. In a device of the class described, the combination of a casing open at opposite ends, an instrument board and a mounting therefor closing one end of the casing, said board being mounted for rotary movement about a longitudinal axis, means exteriorly of the casing for rotating the board relative to the casing, a spirit level mounted on the instrument board and rotatable therewith, said spirit level being graduated to indicate fractions of a degree of displacement of the board from its normal position with the level disposed in a horizontal position, means for locking the board accurately in any exact number of degrees of rotary movement from 0° to 90° from said normal position and a camera adapted to be fitted to the other open end in position to photograph the readings of said spirit level and sighting means carried by the casing and rotatable therewith about said axis, said sighting means including two eye tubes, one provided with reflecting means for permitting a view of the spirit level and the other provided with cross hairs adapted to be trained on a distant body.

2. In a device of the class described, the combination of a casing open at opposite ends, an instrument board and a mounting therefor closing one end of the casing, said board being mounted for rotary movement about a longitudinal axis, means exteriorly of the casing for rotating the board relative to the casing, a spirit level mounted on the instrument board and rotatable therewith, said spirit level being graduated to indicate fractions of a degree of displacement of the board from its normal position with the level disposed in a horizontal position, means for locking the board accurately in any exact number of degrees, of rotary movement from 0° to 90° from said normal position, and a camera adapted to be fitted to the other open end in position to photograph the readings of said spirit level.

3. In a device of the class described, the combination of a support, sighting means carried thereby and including two eye tubes, one of which is designed to be trained on a distant body, an instrument board mounted on the support for rotary movement relative thereto about a horizontal axis, a spirit level mounted on the instrument board for rotary movement therewith, means including a graduated scale and pointer for indicating approximately the angle of relative rotary movement between the board and support when the support is rotated in space while the board is held approximately in fixed position with the spirit level in its normal horizontal position manually controlled means for locking the board accurately in an angular position indicated by said scale and pointer, the other eye tube provided with means for viewing the spirit level.

4. In a device of the class described, the combination of an enclosed light tight casing adapted to be rotated in space about a contained horizontal axis, and over all angles from 0° to 90° from the horizontal, uniaxial sighting means extending at right angles to said axis, fixed to and rotated with the casing and adapted to be trained directly on a distant body, means within the casing for indicating all angles of rotation of the casing about said axis from 0° to 90°, means for sighting said indicating means, means within the casing for illuminating said indicating means and manually actuated means for recording the readings of said indicating means whereby a record can be made of said readings at the instant the distant body is visible through the first named sighting means and the indicating means is visible through the last named sighting means.

5. In a device of the class described, the combination of an enclosed light tight casing adapted to be rotated in space about a contained horizontal axis, sighting means extending at right angles to said axis, rotated with the casing and adapted to be trained on a distant body, means within the casing for indicating all angles of rotation of the casing about said axis from 0° to 90°, means within the casing for illuminating said indicating means and means for recording the readings of said indicating means.

6. In a device of the class described, the combination of a support adapted to be rotated in space about a contained horizontal axis, an instrument board carried by the support and mounted for movement relative to the support about said axis, means for indicating approximately the angular rotation of the camera from a normal horizontal position when the instrument board is retained approximately in the normal position it occupies when the support is in its normal horizontal position, a spirit level carried by the board and means for photographically recording both the indicating means and the spirit level.

7. In a device of the class described, the combination of a casing provided at one end with an instrument board mounted for rotary movement about an axis, an instrument carried by the board and rotatable therewith, a binocular mounted in the casing and including two eye tubes, reflecting means visible through one of the tubes for viewing an image of the instrument and the other tube constituting a sighting means adapted to be trained on a distant body and a camera mounted in the other end of the casing and disposed to photograph the instrument in all rotative positions of the instrument board.

8. In a device of the class described, the combination of a support, sighting means fixed thereto, carried thereby and having a straight line of sight therethrough adapted to be trained on a distant body, an instrument board mounted on the support for relative rotary movement about a horizontal axis, and over all angles 0° to 90° from the horizontal, and adapted to be disposed normally in a vertical plane, a spirit level mounted on the board for rotation therewith about said horizontal axis, normally disposed in a horizontal or approximately horizontal position and provided with means for indicating fractions of a degree of tilt or rotation of the board from such normal horizontal position, means including a scale and pointer for indicating at least approximately the angle of relative rotary movement between the line of sight through the sighting means and the normal horizontal position of said spirit level, and means for locking the instrument board relative to the support at any exact number of degrees within a prescribed maximum and minimum angle of tilt of the board relative to the support.

9. In a photogoniometer, the combination of a casing, having at one end a camera directed towards the opposite end, an instrument board at said opposite end mounted for rotary movement about the optic axis of the camera, and said casing adapted in use to be disposed with the optic axis extending horizontally and with the instrument board extending vertically, means for locking the instrument board to the casing in angularly adjusted positions relative thereto, an inclinometer carried by said board, movable therewith and exposed to the camera at focal distance therefrom whereby the camera may be rotated in space about said axis and a photograph taken at will of the inclinometer in any rotated position of the casing, and a source of light contained within the casing, and disposed to illuminate the inclinometer without shining directly into the camera.

10. In a device of the class described, the combination of an instrument provided with an open end casing with sighting means fixed to and movable with the casing and with means within the casing for visually indicating the angle between the horizontal and the line of sight through said sighting means, a camera complete per se and including a manually actuated control therefor, and readily manipulated securing means for temporarily locating the camera, relative to the instrument at the open end of the casing and in position to photograph the readings of said indicating means within the casing whereby a permanent photographic record may be made of said readings at any instant of time determined by the operator while viewing the readings of the indicating means and whereby the camera as a whole may be readily separated from the instrument.

11. In a device of the class described, the combination of an open end casing, means at one end for mounting a camera directed towards the opposite end, means at said opposite end including an instrument board mounted for rotary movement about the axis of the camera, sighting means fixed to the casing and adapted to be trained on a distant body, means carried by the instrument board and rotated therewith for indicating the angle between the line of sight through said sighting means and the horizontal, and means for adjusting the rotative position of said instrument board and for securing the same to the casing in its adjusted position.

12. In a device of the class described, the combination of a camera, means for limiting the field of the camera, said means including a circular instrument board and its mounting, said board mounted for rotary movement about the optic axis of the camera, the periphery of the instrument board and the adjacent portion of the mounting provided with means for indicating the angle of relative rotation between the instrument board and its mounting measured from a normal position, and adapted to measure all such angles from 0° to 90° from the horizontal, a spirit level extending lengthwise approximately diametrically of the board secured to rotate therewith, and graduated to indicate plus and minus, a relatively small number of degrees and fractions thereof, said indicating means and said spirit level being both exposed to the camera.

13. In a photogoniometer, the combination of a casing, having at one end a camera directed towards the opposite end, an instrument board at said opposite end mounted for rotary movement about the optic axis of the camera, means for locking the instrument board to the casing in angularly adjusted positions relative thereto, an inclinometer carried by said board, movable therewith, and exposed to the camera at focal distance therefrom whereby the camera may be rotated in space about said axis and a photograph taken at will of the inclinometer in any rotated position of the casing, and sighting means carried by the casing extending at right angles to said axis and adapted to be trained on a distant body.

14. In a photogoniometer, the combination of an instrument board adapted to be disposed in a vertical plane and provided with a line of reference and means for indicating when said line of reference is horizontal, a sighting means mounted for rotary movement in a plane parallel to the plane of said board and about an axis perpendicular to said line of reference and adapted to be trained on a distant body and means for photographically recording the angle between said line of reference and the line of sight through said sighting means.

15. In a photogoniometer, the combination of a casing provided at one end with an instrument board mounting and with means at the opposite end to locate a camera in position directed towards the first mentioned end, an instrument board mounted for rotary movement in said board mounting, a handle accessible from the outside of the casing for rotating said instrument board, angle indicating instrument carried by said board exposed towards the camera end of the casing and sighting means carried by the casing.

16. In a device of the class described, the combination of a support adapted to be rotated in space about a contained horizontal axis, uniaxial sighting means fixed to the support and adapted to have its straight line of sight trained directly on a distant body, means including a gross indicator and a spirit level coacting to indicate accurately all angles of rotation of the support about said axis from its normal horizontal position up to ninety degrees therefrom and means for photographically recording the readings of said indicating means.

17. In a photogoniometer, the combination of a casing, having at one end a camera directed towards the opposite end, an instrument board at said opposite end mounted for rotary movement about the optic axis of the camera, means for locking the instrument board to the casing in angularly adjusted positions relative thereto, an inclinometer carried by said board, movable therewith, and exposed to the camera at focal distance therefrom whereby the camera may be rotated in space about said axis and a photograph taken at will of the inclinometer in any rotated position of the casing.

18. In a device of the class described, the combination of a camera, means for limiting the field of the camera, said means including a circular instrument board and its mounting, said board mounted for rotary movement about the optic axis of the camera, the periphery of the instrument board and the adjacent portion of the mounting provided with means for indicating the angle of relative rotation between the instrument board and its mounting measured from a normal position, a spirit level extending lengthwise approximately diametrically of the board and secured to rotate therewith and said indicating means and said spirit level being both exposed to the camera.

19. In a device of the class described, the combination of an open end casing, means at one end for mounting a camera directed towards the opposite end, means at said opposite end including an instrument board mounted for rotary movement about the axis of the camera, sighting means carried by the casing and adapted to be trained on a distant body, means carried by the instrument board and rotated therewith for indicating the angle between the line of sight through said sighting means and the horizontal.

20. In a device of the class described, the combination of a support, sighting means carried thereby and adapted to be trained on a distant body, an instrument board mounted on the support for relative rotary movement about a horizontal axis, a spirit level mounted on the board for rotation therewith, normally disposed in a horizontal or approximately horizontal position and provided with means for indicating fractions of a degree of tilt of the board from such normal horizontal position, means including a scale and pointer for indicating at least approximately the angle of relative rotary movement between the line of sight through the sighting means and the normal horizontal position of said spirit level, and means for locking the instrument board relative to the support at any exact number of degrees within a prescribed maximum and minimum angle of tilt of the board relative to the support, and means for photographically recording simultaneously the reading of both the spirit level and the scale and pointer means.

21. In a device of the class described, the combination of an instrument board, means for mounting the same for rotary movement about an axis, means including a scale and pointer for indicating visually the approximate angle which the board is rotated from a normal position, and an inclinometer capable of indicating accurately small angular variations of a line of reference on the board from a true horizontal or vertical and means for photographically recording simultaneously the scale, pointer, and inclinometer.

22. In a device of the class described, the combination of an instrument board, means for mounting the same for rotary movement about an axis, means including a scale and pointer for indicating visually the approximate angle which the board is rotated from a normal position, and an inclinometer capable of indicating accurately small angular variations of a line of reference on the board from a true horizontal or vertical and means for photographically recording simultaneously the scale, pointer and inclinometer.

23. In a device of the class described, the combination of a casing provided at one end with an instrument board mounted for rotary movement about an axis, an instrument carried by the board and rotatable therewith, a binocular mounted in the casing and including two eye tubes, reflecting means visible through one of the tubes for viewing an image of the instrument and the other tube constituting a sighting means adapted to be trained on a distant body.

24. In a device of the class described, the combination of an instrument board mounted for rotary movement and faced on one side with a sheet of black enamel and provided with means for indicating the rotary movement of the board, said means including a segmental scale graduated in white characters, a spirit level mounted on said board to turn therewith, disposed in offset relation to the scale and having its bubble element contrasting vividly with the black sheet as a background, and a camera disposed to photograph said scale and said spirit level, and sighting means adapted to be trained on a distant body and provided with means for vewing said scale and spirit level bubble with their contrasting black background.

25. In a device of the class described, the combination of an instrument board mounted for rotary movement and faced on one side with a sheet of black enamel and provided with means for indicating the rotary movement of the board, said means including a segmental scale graduated in white characters, a spirit level mounted on said board to turn therewith, disposed in offset relation to the scale and having its bubble element contrasting vividly with the black sheet as a background, and a camera disposed to photograph said scale and said spirit level.

Signed at Lakehurst, in the county of Ocean and State of New Jersey, this 19th day of November, A. D. 1929.

MAURICE R. PIERCE.